United States Patent
Teraya (10) Patent No.: US 9,004,207 B2
(45) Date of Patent: Apr. 14, 2015

(54) CONTROL APPARATUS AND CONTROL METHOD FOR HYBRID VEHICLE

(71) Applicant: Ryuta Teraya, Susono (JP)

(72) Inventor: Ryuta Teraya, Susono (JP)

(73) Assignee: Toyoda Jidosha Kabushiki Kaisha, Toyota-shi (JO)

( * ) Notice: Subject to any disclaimer, the term of this patent is extended or adjusted under 35 U.S.C. 154(b) by 0 days.

(21) Appl. No.: 14/021,668

(22) Filed: Sep. 9, 2013

(65) Prior Publication Data

US 2014/0005872 A1    Jan. 2, 2014

Related U.S. Application Data

(63) Continuation of application No. 12/540,688, filed on Aug. 13, 2009, now Pat. No. 8,631,887.

(30) Foreign Application Priority Data

Aug. 25, 2008    (JP) ................... 2008-215450

(51) Int. Cl.
*B60W 10/06*    (2006.01)
*B60W 20/00*    (2006.01)
(Continued)

(52) U.S. Cl.
CPC ............ *B60W 20/00* (2013.01); *B60K 6/445* (2013.01); *B60W 10/06* (2013.01); *B60W 10/08* (2013.01); *B60K 6/28* (2013.01); *F02D 41/1495* (2013.01); *B60L 2240/445* (2013.01);
(Continued)

(58) Field of Classification Search
USPC ................ 180/65.265, 65.275, 65.28, 65.29
See application file for complete search history.

(56) References Cited

U.S. PATENT DOCUMENTS

| 5,492,190 A | 2/1996 | Yoshida |
| 6,343,252 B1 | 1/2002 | Asami et al. |

(Continued)

FOREIGN PATENT DOCUMENTS

| JP | 9098517 A | 4/1997 |
| JP | 2000282909 A | 10/2000 |

(Continued)

OTHER PUBLICATIONS

Notice of Allowance dated Sep. 17, 2013 for U.S. Appl. No. 12/540,688.

(Continued)

*Primary Examiner* — J. Allen Shriver, II
*Assistant Examiner* — Travis Coolman
(74) *Attorney, Agent, or Firm* — Gifford, Krass, Sprinkle, Anderson & Citkowski, P.C.

(57) ABSTRACT

A vehicle includes a charging unit for externally charging a power storage unit with electric power received from an external power supply, and an electric power generation unit capable of generating electric power from drive force received from an engine. The power storage unit is configured to be internally chargeable with electric power received from the electric power generation unit. The vehicle travels in selected one of EV priority mode restricting internal charging of the power storage unit and HV priority mode controlling internal charging such that a state of charge of the power storage unit is kept within a predetermined range. When a predetermined operating condition is satisfied while the vehicle is traveling, a control apparatus generates an operation request to the engine. The control apparatus changes the operating condition of the engine depending on whether the mode is EV priority mode or HV priority mode.

4 Claims, 7 Drawing Sheets

(51) Int. Cl.
*B60K 6/445* (2007.10)
*B60W 10/08* (2006.01)
*B60K 6/28* (2007.10)
*F02D 41/14* (2006.01)
*F02N 11/08* (2006.01)

(52) U.S. Cl.
CPC . *B60W 2510/0676* (2013.01); *B60W 2510/244* (2013.01); *B60W 2510/246* (2013.01); *Y02T 10/54* (2013.01); *Y02T 10/6239* (2013.01); *Y02T 10/6269* (2013.01); *Y02T 10/6278* (2013.01); *Y02T 10/6286* (2013.01); *Y10S 903/93* (2013.01); *F02N 11/0818* (2013.01)

(56) References Cited

U.S. PATENT DOCUMENTS

| | | | |
|---|---|---|---|
| 6,718,758 | B1 | 4/2004 | Suzuki |
| 6,892,541 | B2 | 5/2005 | Suzuki |
| 7,007,464 | B1 | 3/2006 | Asami et al. |
| 7,380,537 | B2 | 6/2008 | Yamaguchi et al. |
| 7,980,342 | B2 | 7/2011 | Andri |
| 2002/0157651 | A1 | 10/2002 | Hasegawa et al. |
| 2003/0172643 | A1 | 9/2003 | Suzuki |
| 2006/0180362 | A1 | 8/2006 | Yamaguchi et al. |
| 2009/0101421 | A1 | 4/2009 | Oyobe et al. |
| 2010/0044131 | A1 | 2/2010 | Teraya |
| 2010/0087973 | A1 | 4/2010 | Kaita et al. |
| 2010/0121510 | A1 | 5/2010 | Watanabe |

FOREIGN PATENT DOCUMENTS

| | | |
|---|---|---|
| JP | 2001115869 A | 4/2001 |
| JP | 2001-132491 A | 5/2001 |
| JP | 2002-327640 A | 11/2002 |
| JP | 2004068789 A | 3/2004 |
| JP | 2005146910 | 6/2005 |
| JP | 2007-062589 A | 3/2007 |
| JP | 2007062638 A | 3/2007 |
| JP | 2007-238022 A | 9/2007 |
| JP | 2007-302185 A | 11/2007 |
| JP | 2008094139 A | 4/2008 |

OTHER PUBLICATIONS

Office action dated Jun. 19, 2012 from corresponding Japanese Patent Application No. 2010-165796 and English language translation thereof.

CONTROL APPARATUS AND CONTROL METHOD FOR HYBRID VEHICLE

This nonprovisional application is a continuation of U.S. patent application Ser. No. 12/540,688, filed Aug. 13, 2009, which claims priority to Japanese Patent Application No. 2008-215450 filed on Aug. 25, 2008, the entire contents of which are hereby incorporated by reference.

BACKGROUND OF THE INVENTION

1. Field of the Invention

The present invention relates to a control apparatus and a control method for a hybrid vehicle, and more particularly to a control apparatus and a control method for a hybrid vehicle mounted with an internal combustion engine and an electric motor serving as a source of power for causing the vehicle to travel.

2. Description of the Background Art

In view of environmental issues, hybrid vehicles traveling by efficiently using an internal combustion engine and an electric motor in combination have recently become practically available. Such a hybrid vehicle is mounted with a chargeable and dischargeable power storage unit, supplies electric power to the electric motor so as to generate drive force for starting or accelerating for example, and recovers electric power from the vehicle's kinetic energy in traveling on a downhill or braking for example.

For the hybrid vehicle of this type, a configuration has been proposed for charging the mounted power storage unit with electric power supplied from an external power supply such as commercial power supply. The vehicle having the power storage unit thus charged in advance by an external power supply can travel with the internal combustion engine kept stopped, as long as the vehicle travels over a relatively short distance, for commuting or shopping, for example. Accordingly, the fuel economy of the vehicle can be improved. The travel in such a manner is also referred to as "EV (Electric Vehicle) travel mode."

Japanese Patent Laying-Open No. 09-098517 for example discloses how the state of charge of a battery changes relative to the travel distance, in a hybrid vehicle of the above-described type. According to the disclosure, before the vehicle starts traveling, a charger or the like is used to charge the battery (power storage unit) with electric power in advance, so that the state of charge of the battery is 100%. Then, the vehicle is caused to start traveling by driving an electric motor with the electric power stored in the battery. As the travel distance increases, the state of charge of the battery decreases. When the state of charge decreases for example to 50%, a power source (internal combustion engine) is driven so that an electric generator starts generating electric power. The electric power generated at this time is supplied to the electric motor and also stored in the battery. When the state of charge of the battery increases to reach 55%, the power source is stopped from being driven so that power generation by the electric generator is also stopped. Then, the vehicle travels by driving the electric motor with only the electric power of the battery again.

For the hybrid vehicle disclosed in Japanese Patent Laying-Open No. 09-098517 as described above, the travel distance in the EV travel mode can be increased by storing electric power in the power storage unit in advance before the vehicle is started.

Even while the vehicle is running in the EV travel mode, the internal combustion engine may be started if the driver of the vehicle makes a request for quick acceleration, for example, so that excessive discharge from the power storage unit can be avoided.

As long as the hybrid vehicle is mounted with the internal combustion engine, the hybrid vehicle is also mounted with a catalytic converter for purifying exhaust gas from the internal combustion engine, like the conventional vehicle having an internal combustion engine only as a source of power. Thus, a warm-up request may be given for promoting warm-up of the internal combustion engine or catalytic converter even while the vehicle is running in the EV travel mode. Then, even if the hybrid vehicle can run in the EV travel mode to reach the destination without driving the internal combustion engine, the travel distance could be difficult to extend since the internal combustion engine or catalytic converter is warmed up in response to the warm-up request, possibly resulting in deterioration in fuel economy.

Particularly for the hybrid vehicle of the type having the power storage unit chargeable with an external power supply as described above, the travel distance in the EV travel mode is increased and the vehicle may travel mostly in the EV travel mode. The problem as described above may be critical accordingly. Therefore, for the hybrid vehicle, the travel distance in the EV travel mode is considerably influenced by how the operating condition of the internal combustion engine is set.

SUMMARY OF THE INVENTION

An object of the present invention is to provide a control apparatus for a hybrid vehicle with which the travel distance in the EV travel mode can be extended and deterioration in fuel economy can be prevented.

According to an aspect of the present invention, a control apparatus for a hybrid vehicle mounted with an internal combustion engine and an electric motor serving as a source of power for causing the vehicle to travel is provided. The hybrid vehicle includes: a chargeable and dischargeable power storage unit; a charging unit for externally charging the power storage unit with electric power received from an external power supply, when the power storage unit is caused to enter a state chargeable by the external power supply; and an electric power generation unit capable of generating electric power from drive force received from the internal combustion engine. The electric motor generates drive force from electric power received from the power storage unit. The power storage unit is configured to be internally chargeable with electric power received from the electric power generation unit. The control apparatus includes: a mode selection unit for selecting one of a first travel mode and a second travel mode for causing the vehicle to travel, the first travel mode restricting internal charging of the power storage unit by the electric power generation unit, and the second travel mode controlling internal charging of the power storage unit by the electric power generation unit such that a state of charge of the power storage unit is kept within a predetermined range; an operation request generation unit for generating an operation request to the internal combustion engine when a predetermined operating condition is satisfied while the vehicle is traveling; and an intermittent operation control unit for starting the internal combustion engine in response to the operation request and stopping the internal combustion engine in response to cancellation of the operation request. The operation request generation unit changes the predetermined operating condition depending on whether the first travel mode is selected or the second travel mode is selected.

Preferably, the control apparatus further includes a start preparation unit for preparing for start of the internal combustion engine by preheating a sensor provided to an exhaust system for the internal combustion engine. The operation request generation unit generates the operation request when preparation for start of the internal combustion engine is completed while the second travel mode is selected, and the operation request generation unit does not generate the operation request when preparation for start of the internal combustion engine is completed while the first travel mode is selected.

Preferably, the operation request generation unit generates the operation request when coolant temperature of the internal combustion engine is lower than a first threshold value while the first travel mode is selected, and generates the operation request when the coolant temperature of the internal combustion engine is lower than a second threshold value larger than the first threshold value while the second travel mode is selected.

Preferably, the control apparatus further includes a calculation unit for calculating a cumulative intake air amount from the time when the internal combustion engine is started. The operation request generation unit generates the operation request when the cumulative intake air amount is less than a first reference amount while the first travel mode is selected, and generates the operation request when the cumulative intake air amount is less than a second reference amount larger than the first reference amount while the second travel mode is selected.

Preferably, the control apparatus further includes a catalyst temperature obtaining unit for obtaining temperature of a catalyst capable of purifying exhaust gas discharged from the internal combustion engine. The operation request generation unit generates the operation request when the temperature of the catalyst is lower than a first allowable temperature while the first travel mode is selected, and generates the operation request when the temperature of the catalyst is lower than a second allowable temperature higher than the first allowable temperature while the second travel mode is selected.

Preferably, the control apparatus further includes a catalyst warm-up unit for controlling the internal combustion engine such that a catalyst capable of purifying exhaust gas discharged from the internal combustion engine is warmed up. The operation request generation unit generates the operation request until catalyst warm-up duration from the time when the internal combustion engine is started becomes equal to a first specified time while the first travel mode is selected, and generates the operation request until the catalyst warm-up duration becomes equal to a second specified time longer than the first specified time while the second travel mode is selected.

Preferably, the control apparatus further includes a state estimation unit for estimating a state of charge of the power storage unit. The mode selection unit selects the first travel mode when the state of charge is not smaller than a predetermined value, and switches the first travel mode to the second travel mode when the state of charge becomes smaller than the predetermined value.

In accordance with the present invention, the travel distance in the EV travel mode can be increased and accordingly deterioration in fuel economy can be prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be hereinafter described in detail with reference to the drawings. In the drawings, like or corresponding components are denoted by like reference characters.

<General Configuration of Vehicle>

Figure 1:
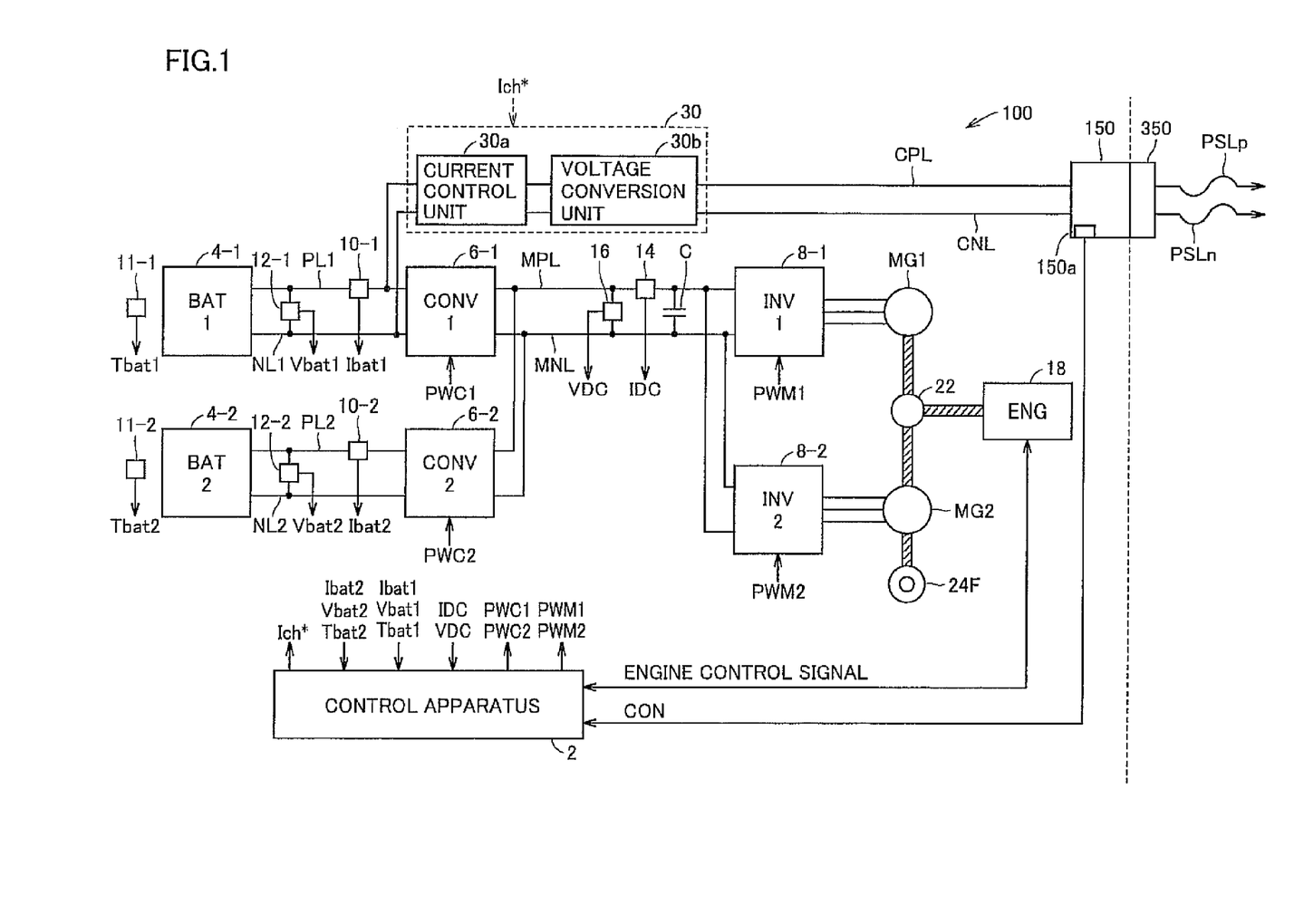
FIG. 1 is a diagram of a general configuration for charging a vehicle using an external power supply according to an embodiment of the present invention.

FIG. 1 is a diagram of a general configuration for charging a vehicle 100 using an external power supply according to an embodiment of the present invention.

Referring to FIG. 1, vehicle 100 in an embodiment of the present invention is typically a hybrid vehicle, mounted with an internal combustion engine (engine) 18 and electric motors (motor generators) MG1, MG2, and travels with the ratio between respective drive forces from the engine and the motors controlled at an optimum ratio. Vehicle 100 is further mounted with (two for example) power storage units for supplying electric power to the motor generators. These power storage units can be charged using the power generated from operation of engine 18 while a system of vehicle 100 is activated (also referred to as "IG ON state" hereinafter), and can be charged by being electrically connected to an external power supply via a connector unit 350 while the system of vehicle 100 is stopped (also referred to as "IG OFF state" hereinafter). In the following description, for the purpose of distinguishing respective charging manners from each other, charging of the power storage units by means of an external power supply is also referred to as "external charging" and charging of the power storage units using the power generated from the operation of the engine is also referred to as "internal charging."

Connector unit 350 constitutes a coupling mechanism for providing an external power supply, typically commercial power supply, to vehicle 100, and coupled to a charging station (not shown) via electric power lines PSLp, PSLn formed of cabtire cable or the like. Connector unit 350 is coupled to vehicle 100 for external charging and electrically connects an external power supply and a charging unit 30 mounted on vehicle 100. Vehicle 100 is provided with a connector receiving unit 150 coupled to connector portion 350 for receiving an external power supply.

The external power supply provided to vehicle 100 via connector portion 350 may be electric power generated by a solar battery panel disposed on the roof or the like of a housing instead of or in addition to the commercial power supply.

Vehicle 100 includes engine (ENG) 18, first motor generator MG1 and second motor generator MG2 as sources of drive force, and the engine and motor generators are mechanically coupled via a power split device 22. Depending on the traveling status of vehicle 100, the drive force is distributed between the engine and the two motor generators or respective drive forces are combined, via power split device 22, and accordingly drive wheel 24F is driven.

While vehicle 100 is traveling (namely the vehicle is not externally charged), power split device 22 splits the drive force generated from operation of engine 18 into the one to be supplied to first motor generator MG1 and the remaining one to be supplied to second motor generator MG2. The drive force provided from power split device 22 to first motor generator MG1 is used for generating electric power, while the drive force provided from power split device 22 to second motor generator MG2 is combined with the drive force generated by second motor generator MG2 for use in driving drive wheel 24F.

At this time, a first inverter (INV1) 8-1 and a second inverter (INV2) 8-2 associated respectively with motor generator MG1 and motor generator MG2 make conversion between DC power and AC power. First inverter 8-1 chiefly converts AC power generated by first motor generator MG1 into DC power in response to switching command PWM1 from a control apparatus 2, and supplies the resultant DC power to a main positive line MPL and a main negative line MNL. Second inverter 8-2 chiefly converts DC power supplied via main positive line MPL and main negative line MNL into AC power in response to switching command PWM2 from control apparatus 2 and supplies the resultant AC power to second motor generator MG2. In other words, vehicle 100 includes, as load devices, second motor generator MG2 capable of generating drive force from the electric power received from power storage units 4-1, 4-2 as well as first motor generator MG1 serving as an electric generator capable of generating electric power from drive force received from engine 18.

First power storage unit (BAT1) 4-1 and second power storage unit (BAT2) 4-2 are both chargeable and dischargeable electric power storage elements. Typically, the power storage units are each formed of a secondary battery such as lithium-ion battery or nickel-metal hydride battery, or power storage element such as electrical double layer capacitor. A first converter (CONV1) 6-1 capable of stepping up or stepping down a DC voltage is disposed between first power storage unit 4-1 and first inverter 8-1 to step up or step down the input/output voltage of first power storage unit 4-1 and the voltage between main positive line MPL and main negative line MNL. Likewise, a second converter (CONV2) 6-2 capable of stepping up or stepping down a DC voltage is disposed between second power storage unit 4-2 and second inverter 8-2 to step up or step down the input/output voltage of second power storage unit 4-2 and the voltage between main positive line MPL and main negative line MNL. Specifically, converters 6-1, 6-2 are connected in parallel with respect to main positive line MPL and main negative line MNL that are a pair of electric power lines. The voltage step-up and voltage step-down operations of converters 6-1, 6-2 are controlled in response to switching commands PWC1, PWC2 from control apparatus 2.

Control apparatus 2 is typically formed of an electronic control unit (ECU) configured to include a CPU (Central Processing Unit), a storage unit such as RAM (Random Access Memory) or ROM (Read Only Memory), and an input/output interface, as main components. Control apparatus 2 controls travel of the vehicle (including internal charging) and external charging by causing the CPU to read a program stored in advance in the ROM for example into the RAM and execute the program.

FIG. 1 shows, by way of example, information that is input to control apparatus 2, including battery currents Ibat1, Ibat2 from current sensors 10-1, 10-2 disposed at positive lines PL1, PL2 respectively, battery voltage Vbat1 from a voltage sensor 12-1 disposed between positive line PL1 and a negative line NL1, battery voltage Vbat2 from a voltage sensor 12-2 disposed between positive line PL2 and a negative line NL2, battery temperatures Tbat1, Tbat2 from temperature sensors 11-1, 11-2 disposed near power storage units 4-1, 4-2, respectively, main line current IDC from a current sensor 14 disposed at main positive line MPL and main line voltage VDC from a voltage sensor 16 disposed between main positive line MPL and main negative line MNL.

Control apparatus 2 successively estimates the state of charge (may be simply referred to as "SOC" hereinafter) of power storage units 4-1, 4-2. SOC may be represented as the absolute value of the amount of charge in the power storage unit (unit: [A·h] for example). SOC is herein represented as the ratio (0 to 100%) of the amount of charge relative to the chargeable capacity of the power storage unit. More specifically, control apparatus 2 successively calculates the SOC of first power storage unit 4-1 based on the integral of the charge/discharge amount of first power storage unit 4-1, and successively calculates the SOC of second power storage unit 4-2 based on the integral of the charge/discharge amount of second power storage unit 4-2. The integral of the charge/discharge amount is determined by integrating the product of the battery voltage and the battery current (product: electric power) of a relevant power storage unit with respect to time.

Vehicle 100 further includes connector receiving unit 150 and charging unit 30 as components for externally charging power storage units 4-1, 4-2. In the case where power storage units 4-1, 4-2 are to be externally charged, connector unit 350 is coupled to connector receiving unit 150, so that electric power from an external power supply is provided to charging unit 30 via a charge positive line CPL and a charge negative line CNL. Connector receiving unit 150 includes a coupling detection sensor 150a for detecting the state of coupling between connector receiving unit 150 and connector unit 350. According to coupling signal CON from this coupling detection sensor 150a, control apparatus 2 detects that the vehicle is in a state chargeable by an external power supply. The present embodiment will be illustrated where a single-phase AC commercial power supply is used as an external power supply.

"State chargeable by an external power supply" herein typically refers to the state where connector unit 350 is physically inserted into connector receiving unit 150. In a configuration other than that shown in FIG. 1, such as a configuration where an external power supply and the vehicle are electromagnetically coupled for supplying electric power to the vehicle with the power supply and the vehicle apart from each other, specifically the configuration where a primary coil is provided to the external power supply and a secondary coil is provided to the vehicle so that the electric power is supplied using the mutual inductance between the primary coil and the secondary coil, "state chargeable by an external power supply" refers to the state where the primary coil and the secondary coil are aligned.

Charging unit 30 is a device for externally charging power storage units 4-1, 4-2 with electric power received from an external power supply, and is disposed between positive line PL1 and negative line NL1, and charge positive line CPL and charge negative line CNL. Specifically, charging unit 30 is electrically connected between first power storage unit 4-1 and first converter 6-1 associated with first power storage unit 4-1.

Charging unit 30 includes a current control unit 30a and a voltage conversion unit 30b, and converts the electric power from an external power supply into the electric power appropriate for charging power storage units 4-1, 4-2. Specifically, voltage conversion unit 30b is a device for converting the voltage supplied from an external power supply into a voltage appropriate for charging power storage units 4-1, 4-2, and typically formed of a winding-type transformer having a predetermined transformer ratio, or AC-AC switching regulator for example. Current control unit 30a rectifies the AC voltage after conversion by voltage conversion unit 30b to generate a DC voltage, and controls the charge current to be supplied to power storage units 4-1, 4-2 according to charge current command Ich* from control apparatus 2. Current control unit 30a is typically formed of a single-phase bridge circuit, for example. Charging unit 30 may be implemented using an AC-DC switching regulator or the like, instead of the configuration constituted of current control unit 30a and voltage conversion unit 30b.

Vehicle 100 in the present embodiment is a hybrid vehicle in which the drive force from engine 18 can be used to cause the vehicle to travel and charge power storage units 4-1, 4-2. In the case where power storage units 4-1, 4-2 are externally charged as described above, it is preferable that the vehicle travels with engine 18 kept stopped as much as possible in terms of improvement in fuel economy. Accordingly, vehicle 100 in the present embodiment is configured to be able to travel in a mode selected from "HV priority mode" and "EV priority mode" giving priority to fuel economy as compared with the HV priority mode, according to the SOC of power storage units 4-1, 4-2.

Specifically, until the SOC of power storage units 4-1, 4-2 becomes smaller than a predetermined value, vehicle 100 travels in the EV priority mode. In the EV priority mode, vehicle 100 chiefly uses the drive force from second motor generator MG2 to travel. In the following, the manner in which the vehicle travels using second motor generator MG2 only is also referred to as "EV (Electric Vehicle) travel." In the EV priority mode, first motor generator MG1 does not generate electric power from the drive force received from engine 18, and the internal charging of power storage units 4-1, 4-2 is restricted.

The EV priority mode aims to improve fuel economy with engine 18 kept stopped. When a drive force request such as quick acceleration or the like is given from the driver, engine 18 can be started to avoid overdischarge of power storage units 4-1, 4-2. In this case, vehicle 100 changes from the manner of traveling using second motor generator MG2 only (EV travel) to the manner of traveling using engine 18 and second motor generator MG2 (hereinafter also referred to as "HV (Hybrid Vehicle) travel").

When the SOC of power storage units 4-1, 4-2 becomes smaller than a predetermined value while the vehicle is traveling in the EV priority mode, the travel mode is changed to the HV priority mode. In the HV priority mode, electric power generation by first motor generator MG1 is controlled such that the SOC of power storage units 4-1, 4-2 each is kept within a predetermined range centered at a control central value determined in advance. According to electric power generation by first motor generator MG1, engine 18 starts operating. A part of the drive force generated from operation of engine 18 is also used for causing vehicle 100 to travel. In this way, vehicle 100 runs in the HV travel mode.

Thus, in vehicle 100 of the present embodiment, the power storage units may be charged in advance by means of an external power supply, so that the vehicle can travel to the destination in the EV priority mode using the drive force from second motor generator MG2 only, with engine 18 kept stopped, as long as the distance to the destination is relatively short. Accordingly, the distance over which the vehicle can travel in the EV travel mode can be extended.

Even when the vehicle is traveling in the EV priority mode, operation of engine 18 may be required like the HV priority mode, if any request irrelevant to the request for drive force is given, such as catalyst warm-up request or air conditioning request, and if other operating conditions are satisfied, in order to optimize emission properties or vehicle interior environment, for example.

If engine 18 is configured to operate according to an operating condition common to the HV priority mode, even while the vehicle is traveling in the EV priority mode, engine 18 could start operating even in such a case where the vehicle can reach the destination in the EV travel mode. In this case, the travel distance in the EV travel mode cannot be extended, and the advantage of improvement in fuel economy that is a significant advantage of the hybrid vehicle with the external charging capability cannot be sufficiently achieved.

Accordingly, control apparatus 2 in the present embodiment is configured to change the operating condition of engine 18 depending on whether the vehicle is in the HV priority mode or the EV priority mode. Specifically, in the EV priority mode, the operating condition is changed so that engine 18 is operated for a minimum operating time necessary for optimizing emission properties or the like.

The correspondence between the embodiment shown in FIG. 1 and the present invention is as follows. Power storage units 4-1, 4-2 each correspond to "power storage unit," converters 6-1, 6-2 each correspond to "voltage conversion unit," main positive line MPL and main negative line MNL correspond to "pair of electric power lines," charging unit 30 corresponds to "charging unit," second motor generator MG2 corresponds to "electric motor," engine 18 corresponds to "internal combustion engine," and first motor generator MG1 corresponds to "electric power generation unit." Further, "EV priority mode" corresponds to "first travel mode" and "HV priority mode" corresponds to "second travel mode."

<Control Configuration>

A description will be given hereinafter with reference to FIG. 2, concerning a control configuration for implementing operation of engine 18 in a vehicle according to the present embodiment.

Figure 2:
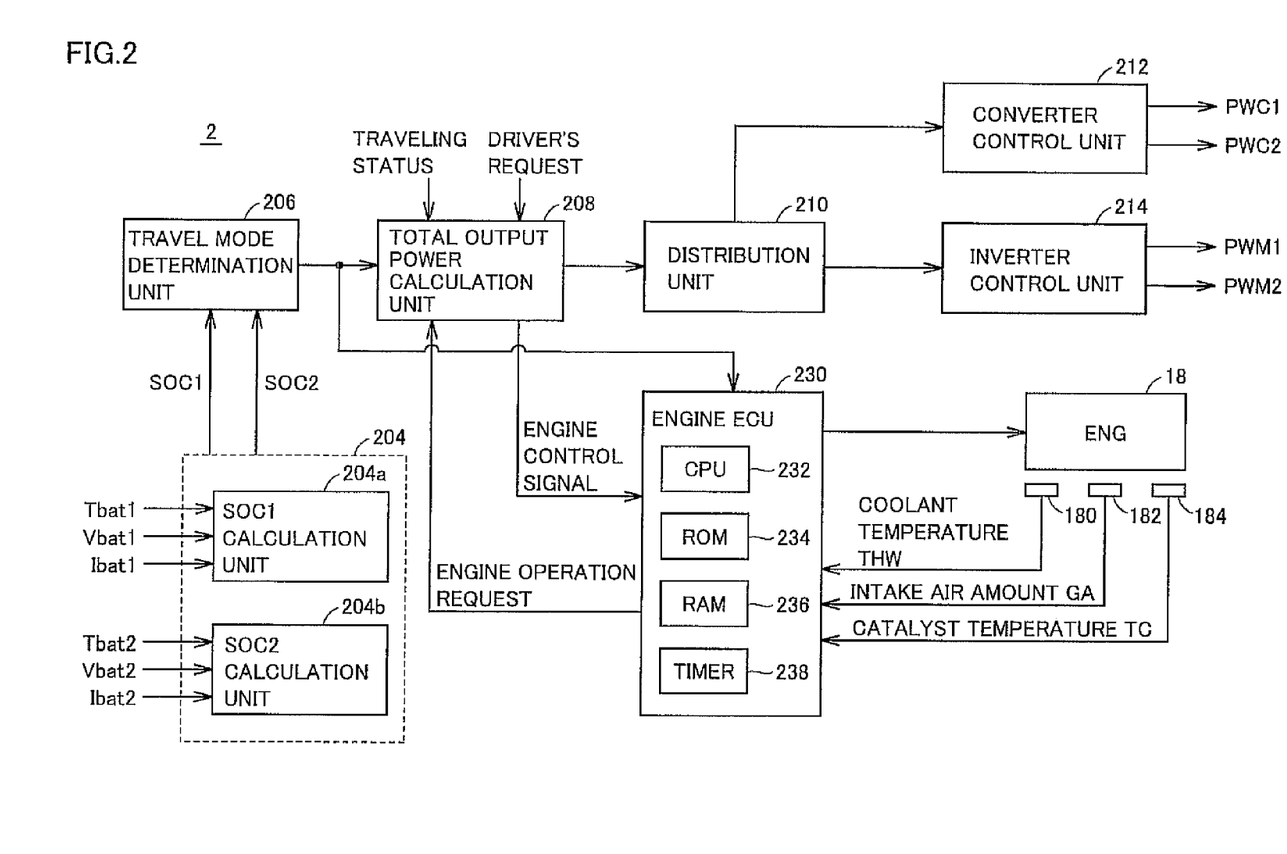
FIG. 2 is a block diagram showing a control configuration of a control apparatus according to an embodiment of the present invention.

FIG. 2 is a block diagram showing a control configuration of control apparatus 2 according to the embodiment of the present invention. The control blocks shown in FIG. 2 may be implemented typically by execution by control apparatus 2 of a program stored in advance. A part or the whole of the functions may be implemented in the form of dedicated hardware.

Referring to FIG. 2, control apparatus 2 includes as its functions a state estimation unit 204, a travel mode determination unit 206, a total output power calculation unit 208, a distribution unit 210, a converter control unit 212, an inverter control unit 214, and an engine ECU 230.

State estimation unit 204 estimates respective SOCs of power storage units 4-1, 4-2 based on battery temperatures Tbat1, Tbat2, battery currents Ibat1, Ibat2, battery voltages Vbat1, Vbat2 for example. More specifically, state estimation unit 204 includes an SOC1 calculation unit 204a for calculating SOC1 of first power storage unit 4-1, and an SOC2 calculation unit 204b for calculating SOC2 of second power storage unit 4-2. SOC1 calculation unit 204a and SOC2 calculation unit 204b each successively calculate the SOC of the associated power storage unit based on the integral of the charge/discharge amount of the associated power storage unit.

Based on SOC1, SOC2 calculated by state estimation unit 204, travel mode determination unit 206 determines the travel mode for vehicle 100. Specifically, when the SOC of power storage units 4-1, 4-2 is not less than a predetermined value set in advance, travel mode determination unit 206 determines that the EV priority mode is the travel mode of vehicle 100. In contrast, when the SOC of power storage units 4-1, 4-2 is smaller than the predetermined value, travel mode determination unit 206 determines that the HV priority mode is the travel mode of vehicle 100. Travel mode determination unit 206 sends the determined travel mode to total output power calculation unit 208 and engine ECU 230.

Thus, in the case where power storage units 4-1, 4-2 are externally charged while the system of vehicle 100 is stopped, vehicle 100 travels in the EV priority mode after the system is activated. When the SOC of power storage units 4-1, 4-2 decreases to become smaller than a predetermined value, vehicle 100 is switched to the HV priority mode.

Total output power calculation unit 208 calculates the total output power necessary for vehicle 100 to travel, according to the travel mode from travel mode determination unit 206, driver's request, traveling status and an engine operation request from engine ECU 230. The driver's request includes, for example, accelerator pedal position, brake pedal position and shift lever position (not shown). The traveling status includes, for example, information that vehicle 100 is accelerating or decelerating. According to the drive force of engine 18 necessary for achieving the total output power, total output power calculation unit 208 determines the rotational speed of the engine, for example. The determined engine rotational speed for example is provided as a control signal to engine ECU 230. The result of calculation by total output power calculation unit 208 is also transmitted to distribution unit 210.

According to the result of calculation from total output power calculation unit 208, distribution unit 210 calculates the torque and the rotational speed for example of motor generators MG1, MG2, and outputs the results of calculation in the form of a control command to inverter control unit 214, and simultaneously outputs a control command according to electric power supply and demand in vehicle 100 to converter control unit 212.

According to the control command from distribution unit 210, inverter control unit 214 generates switching commands PWM1, PWM2 for driving motor generators MG1, MG2. Switching commands PWM1 and PWM2 are output to inverters 8-1 and 8-2, respectively.

According to the control command from distribution unit 210, converter control unit 212 determines the discharge electric power share ratio with reference to SOC 1, SOC2 calculated by state estimation unit 204, so that predetermined discharge electric power is supplied from power storage units 4-1, 4-2 to second motor generator MG2. Converter control unit 212 generates switching commands PWC1, PWC2 so that power storage units 4-1, 4-2 each discharge electric power that should be provided by each power storage unit. According to switching commands PWC1, PWC2, converters 6-1, 6-2 each perform voltage conversion to control the discharge electric power (discharge current) of power storage units 4-1, 4-2.

When the vehicle enters the state chargeable by an external power supply, converter control unit 212 controls voltage conversion by converters 6-1, 6-2 so that respective SOCs of power storage units 4-1, 4-2 are each equal to a target state of charge set in advance.

Specifically, converter control unit 212 controls the relevant converter to charge power storage units 4-1, 4-2 with charge current from charging unit 30, so that external charging of power storage unit 4-1 and external charging of power storage unit 4-2 are completed almost simultaneously. At this time, converter control unit 212 calculates a chargeable capacity of power storage units 4-1, 4-2 each, namely the current chargeable capacity determined by subtracting the current SOC from the target SOC. Converter control unit 212 controls voltage conversion by converters 6-1, 6-2 so that power storage units 4-1, 4-2 are charged with charge current at a charge electric power share ratio according to the ratio between respective chargeable capacities as calculated. In this way, a time lag between completion of charging for one power storage unit and that for the other power storage unit can be avoided.

Engine ECU 230 controls the operating state of engine 18 according to the control signal from total output power calculation unit 208. Specifically, engine ECU 230 is configured as a microprocessor having a CPU 232 as a main element and includes, in addition to CPU 232, a ROM 234 for storing a process program, a RAM 236 for temporarily storing data, a timer 238, and an input/output port and a communication port (not shown).

To engine ECU 230, respective detection signals from various sensors are input. The detection signals from the various sensors include coolant temperature THW from a coolant temperature sensor 180 for detecting the temperature of coolant circulating in a coolant channel (not shown) provided in a cylinder block, intake air amount GA from an airflow meter 182 provided to an intake air system for detecting the amount of air taken into a cylinder of engine 18, and catalyst temperature TC from a temperature sensor 184 for detecting the temperature of a catalyst for a catalytic converter provided to an exhaust system.

The detection signals from various sensors may also include those signals (not shown) including respective detection signals from a throttle position sensor for detecting the opening position of the throttle valve, a crank position sensor for detecting the rotational speed of the crankshaft, an air-fuel ratio sensor for detecting the concentration of un-burned oxygen in exhaust gas, as well as a signal indicating ON/OFF state of the ignition switch, for example.

Based on the engine operating state as seen from respective detection signals from various sensors, for example, engine ECU 230 controls fuel injection, ignition and adjustment of the intake air amount, for example. Further, while vehicle 100 is traveling, engine ECU 230 performs intermittent operation control for intermittent operation of engine 18 to be performed, according to the control signal from total output power calculation unit 208 as described above.

In performing this intermittent operation control, engine ECU 230 generates an engine operation request to total output power calculation unit 208 by a method as described below, when a predetermined operating condition is satisfied. The engine operation request serves as a request to start engine 18 being stopped while serving as a request to inhibit temporary stop, namely inhibit the operating engine from being temporarily stopped (interim stop). In response to the engine operation request as received from engine ECU 230, total output power calculation unit 208 generates a control signal for operating engine 18 and outputs the signal to engine ECU 230. According to the generated control signal, engine ECU 230 controls the operating state of engine 18. Accordingly, engine 18 operates while the engine operation request is generated, and temporarily stops in response to cancellation of the engine operation request.

Here, engine ECU 230 changes the operating condition of engine 18 depending on the travel mode of vehicle 100 that is input from travel mode determination unit 206.

Specifically, engine ECU 230 follows a method as described below to define a threshold value for each of parameters such as coolant temperature THW, intake air amount GA, catalyst temperature TC and the duration in which catalyst is warmed up and, based on a comparison between the parameters obtained from various sensor outputs with respective threshold values, determines whether or not the operating condition for engine 18 is satisfied. In the present embodiment, the threshold value used for making this determination is changed depending on whether the travel mode is the HV priority mode or the EV priority mode.

With reference to FIGS. 3 to 7, a description will be given of a control structure for generating an engine operation request by engine ECU 230 in FIG. 2. Engine ECU 230 can execute any one of the process flows shown in FIGS. 3 to 7 or at least two thereof in appropriate combination.

Figure 3:
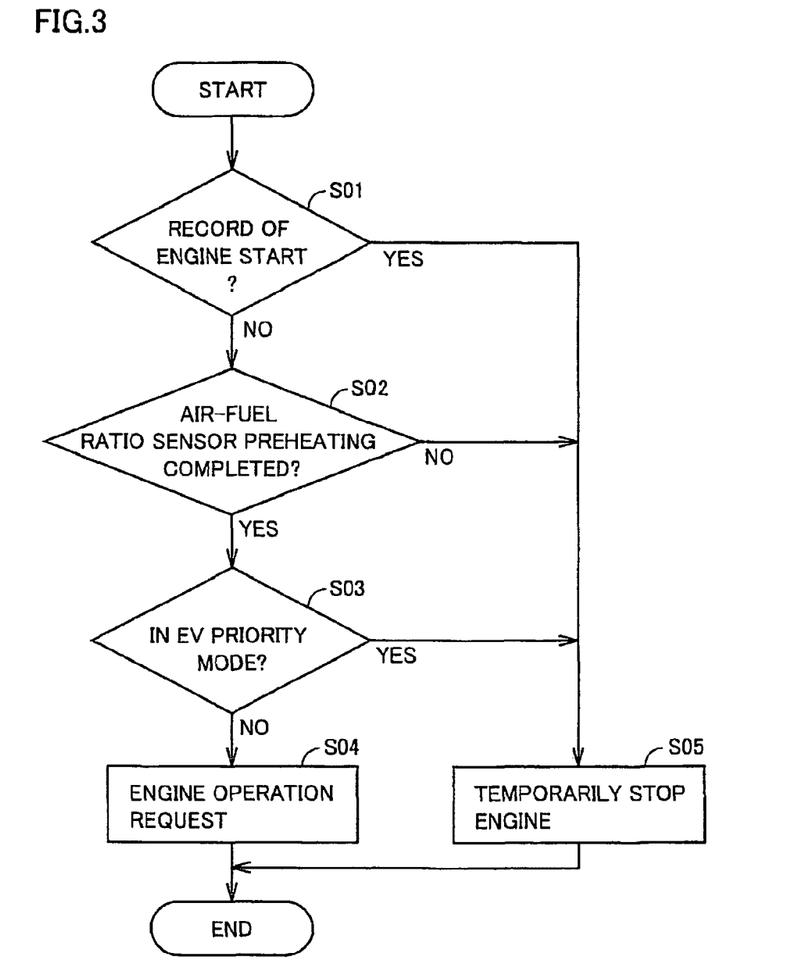
FIGS. 3 to 7 are flowcharts illustrating first to fifth examples, respectively, of a process procedure for generating an engine operation request according to an embodiment of the present invention.

FIG. 3 is a flowchart showing a first example of the process procedure for generating an engine operation request according to an embodiment of the present invention. The process is repeatedly performed at predetermined time intervals by engine ECU 230 (FIG. 2) after the ignition switch is turned on.

Referring to FIG. 3, engine ECU 230 determines whether or not there is a record of the fact that engine 18 is started in a period from the time when the system of vehicle 100 is activated to the present (step S01). The determination in step S01 is made based on the transition of the operating state of engine 18 after the ignition switch is turned on that is stored for example in RAM 236 in the form of an operation record of engine 18.

When there is a record of the fact that engine 18 is started (YES in step S01), engine ECU 230 temporarily stops engine 18 (step S05).

In contrast, when there is no record of the fact that engine 18 is started (NO in step S01), engine ECU 230 then determines whether or not preheating of an air-fuel ratio sensor is completed (step S02). Preheating of the air-fuel ratio sensor refers to heating of a sensor element by a heater, the sensor element being included in the air-fuel ratio sensor used for air-fuel ratio feedback control performed for reducing noxious components in exhaust gas, before engine 18 is started, for the purpose of improving emission from the time immediately after engine 18 is started. Accordingly, the air-fuel ratio can be controlled from the time immediately after the engine is started, even when the engine is cold-started. Preparation for start of engine 18 may include heating of fuel with a heater so as to atomize the fuel. In this case, the air-fuel ratio sensor and the heater for heating the fuel constitute "start preparation unit" of the present invention.

When preheating of the air-fuel ratio sensor has not been completed (NO in step S02), engine ECU 230 temporarily stops engine 18 (step S05).

In contrast, when preheating of the air-fuel ratio sensor has been completed (YES in step S02), engine ECU 230 determines, based on a signal representing a travel mode as provided from travel mode determination unit 206 (FIG. 2), whether or not vehicle 100 is traveling in the EV priority mode (step S03). When vehicle 100 is not traveling in the EV priority mode (NO in step S03), namely vehicle 100 is traveling in the HV priority mode, engine ECU 230 generates the engine operation request for starting engine 18 (step S04).

In contrast, when vehicle 100 is traveling in the EV priority mode (YES in step S03), engine 18 is temporarily stopped (step S05).

As seen from above, the process procedure in FIG. 3 is followed so that, in the HV priority mode, engine 18 is started in response to completion of the preparation for start of engine 18, while in EV priority mode, basically engine 18 is not immediately started even when the preparation for start of engine 18 has been completed. In the EV priority mode, basically engine 18 is kept stopped until a request for drive force for rapid acceleration for example is given from a driver. Thus, in the EV priority mode, as compared with the HV priority mode, it is less necessary to start engine 18 immediately after the preparation for start of the engine is completed. Therefore, engine 18 is not started even if the preparation for start of the engine is completed and thus the travel distance in the EV travel mode can be extended. Accordingly, fuel economy is improved.

Figure 4:
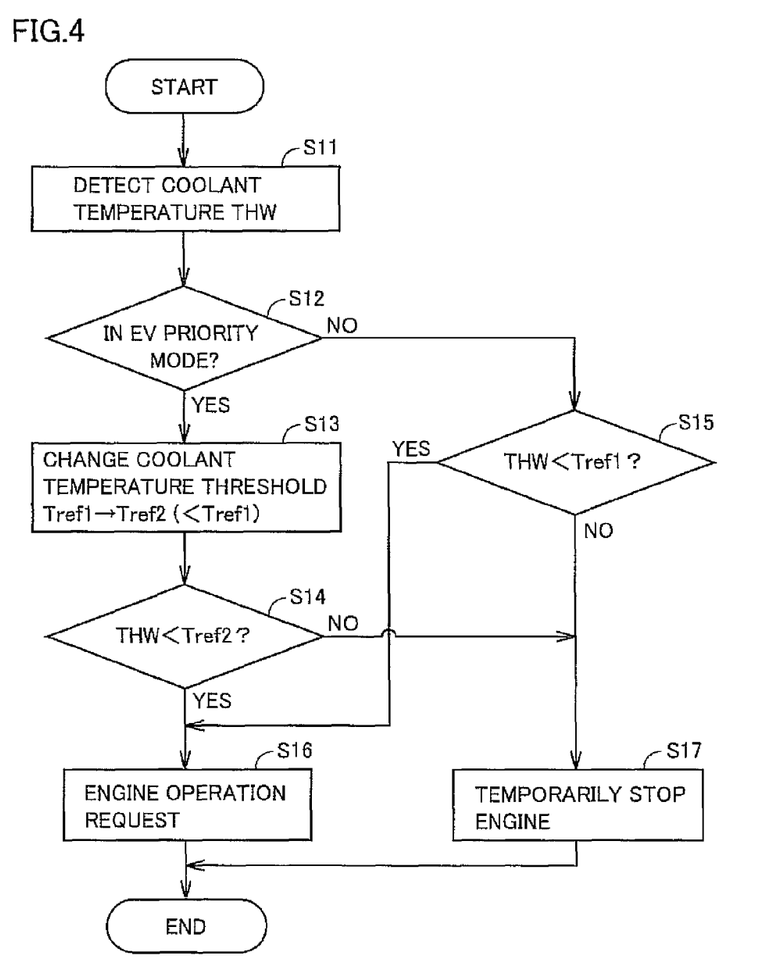

FIG. 4 is a flowchart showing a second example of the process procedure for generating an engine operation request according to an embodiment of the present invention. The process is repeatedly performed at predetermined time intervals by engine ECU 230 (FIG. 2) after the ignition switch is turned on.

Referring to FIG. 4, based on a detection signal that is input from coolant temperature sensor 180 (FIG. 2), engine ECU 230 detects coolant temperature THW that is the temperature of coolant for engine 18 (step S11). Then, based on a signal representing a travel mode from travel mode determination unit 206 (FIG. 2), it is determined whether or not vehicle 100 is traveling in the EV priority mode (step S12).

When vehicle 100 is not traveling in the EV priority mode (NO in step S12), namely vehicle 100 is traveling in the HV priority mode, engine ECU 230 determines whether or not coolant temperature THW is lower than coolant temperature threshold Tref1 set in advance (step S15). When coolant temperature THW is lower than coolant temperature threshold Tref1 (YES in step S15), engine ECU 230 generates the engine operation request for starting engine 18 (step S16).

In contrast, when coolant temperature THW is not less than coolant temperature threshold Tref1 (NO in step S15), engine ECU 230 temporarily stops engine 18 (step S17).

Returning to step S12, when vehicle 100 is traveling in the EV priority mode (YES in step S12), engine ECU 230 changes the coolant temperature threshold from coolant temperature threshold Tref1 for the HV priority mode to Tref2 that is lower than Tref1 (step S13). Then, engine ECU 230 determines whether or not coolant temperature THW is lower than coolant temperature threshold Tref2 after the change (step S14). When coolant temperature THW is lower than coolant temperature threshold Tref2 (YES in step S14), engine ECU 230 generates the engine operation request for starting engine 18 (step S16).

In contrast, when coolant temperature THW is not lower than coolant temperature threshold Tref2 (NO in step S14), engine ECU 230 temporarily stops engine 18 (step S17).

As seen from above, the process procedure in FIG. 4 is followed so that, in the EV priority mode, warm-up of engine 18 is restricted as compared with the HV priority mode, since the coolant temperature threshold for the EV priority mode is set lower than that for the HV priority mode. In the EV priority mode, there are not a few cases where the vehicle traveling in the EV travel mode can reach the destination without driving engine 18 as described above. In particular, vehicle 100 with the external charging capability may travel mostly in the EV travel mode. In such a case, it is less necessary to start engine 18 for ensuring the low-temperature startability and the drivability after the start. Thus, unnecessary warm-up can be restricted to extend the travel distance in the EV travel mode.

Figure 5:
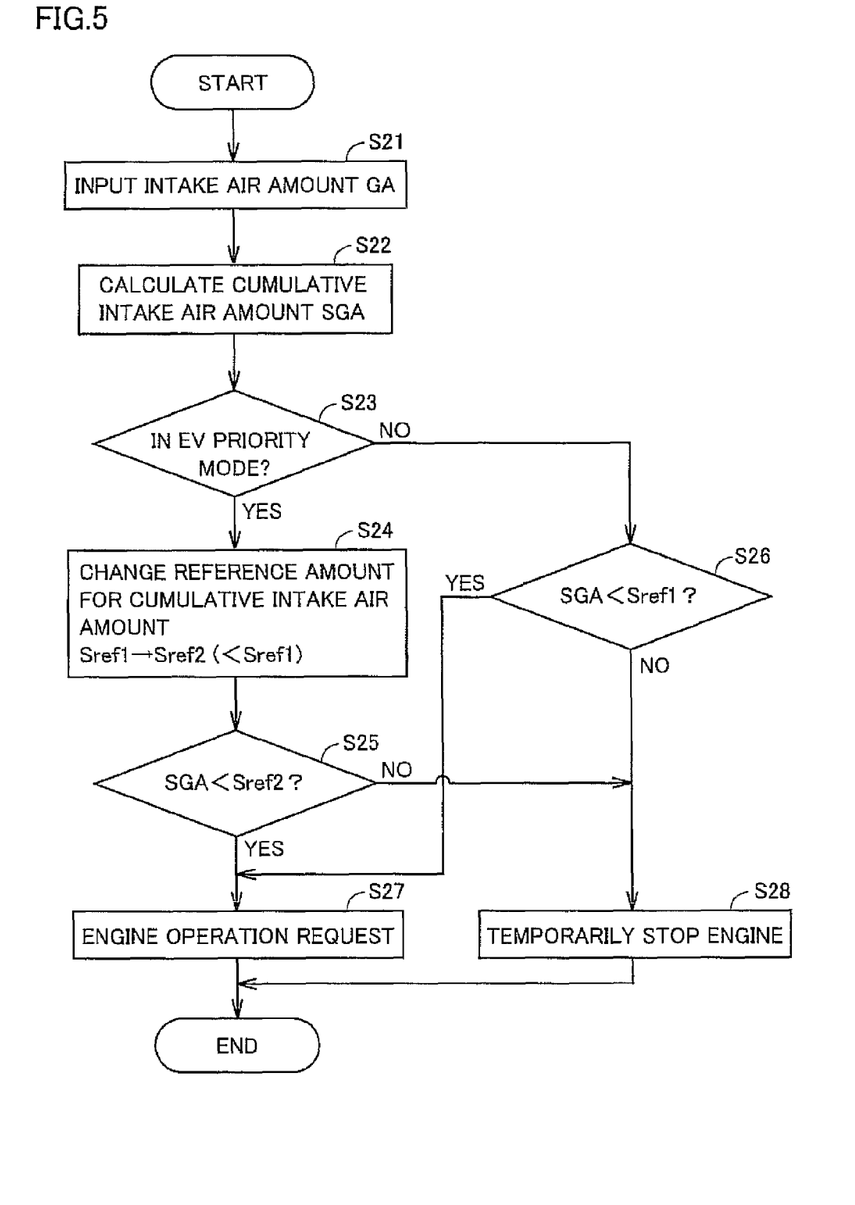

FIG. 5 is a flowchart showing a third example of the process procedure for generating an engine operation request according to an embodiment of the present invention. The process is repeatedly performed at predetermined time intervals by engine ECU 230 (FIG. 2) after the ignition switch is turned on.

Referring to FIG. 5, engine ECU 230 detects intake air amount GA based on a detection signal that is input from airflow meter 182 (FIG. 2) (step S21). Then, engine ECU 230 calculates the integral of intake air amount GA detected successively through airflow meter 182 after engine 18 is started, namely cumulative intake air amount SGA after engine 18 is started (step S22).

Then, based on a signal representing a travel mode from travel mode determination unit 206 (FIG. 2), engine ECU 230 determines whether or not vehicle 100 is traveling in the EV priority mode (step S23).

When vehicle 100 is not traveling in the EV priority mode (NO in step S23), namely vehicle 100 is traveling in the HV priority mode, engine ECU 230 determines whether or not cumulative intake air amount SGA is smaller than reference amount Sref1 set in advance (step S26). When cumulative intake air amount SGA is smaller than reference amount Sref1 (YES in step S26), engine ECU 230 generates the engine operation request for inhibiting temporary stop of engine 18 (step S27).

In contrast, when cumulative intake air amount SGA is not less than reference amount Sref1 (NO in step S26), engine ECU 230 temporarily stops engine 18 (step S28).

Returning to step S23, when vehicle 100 is traveling in the EV priority mode (YES in step S23), engine ECU 230 changes the reference amount from reference amount Sref1 for the HV priority mode to Sref2 smaller than Sref1 (step S24). Then, engine ECU 230 determines whether or not cumulative intake air amount SGA is smaller than reference amount Sref2 after the change (step S25). When cumulative intake air amount SGA is smaller than reference amount Sref2 (YES in step S25), engine ECU 230 generates the engine operation request for inhibiting temporary stop of engine 18 (step S27).

In contrast, when cumulative intake air amount SGA is not smaller than reference amount Sref2 (NO in step S25), engine ECU 230 temporarily stops engine 18 (step S28).

As seen from above, the process procedure shown in FIG. 5 defines the time when operating engine 18 is to be stopped, based on cumulative intake air amount SGA. Specifically, cumulative intake air amount SGA increases with the operating time of the engine after the engine is started. Accordingly, once engine 18 is started, engine 18 is inhibited from being stopped until cumulative intake air amount SGA satisfies the reference amount.

The reason why the time when engine 18 is to be stopped is controlled based on cumulative intake air amount SGA is as follows. If engine 18 is started (restarted) and stopped at short time intervals, engine could not be started due to an increase of fuel when the engine is started, especially when the engine is cold-started.

More specifically, when engine 18 is started, a larger amount of fuel as compared with that in the normal operating state is injected to an intake port for example to start the engine as immediately as possible. When the temperature is extremely low, most of the fuel is not vaporized and accordingly the fuel injected into an intake port remains liquid around the intake valve and a part of the fuel flows along the wall of a cylinder head to attach to the ignition plug. If a large amount of fuel attaches to the plug, the ignition plug is kept covered with fuel, and the fuel cannot be burned. Consequently, the fuel supplied into the combustion chamber remains as it is. Further, when the engine is started for the second time, or third time, fuel is still supplied. The resultant over-rich state in the combustion chamber could make it impossible to start the engine.

In order to avoid the situation as described above, the reference amount for cumulative intake air amount SGA is set to a cumulative intake air amount from the time when engine 18 is started to the time when fuel is stably burned in the combustion chamber.

In the present embodiment, the reference value of cumulative intake air amount SGA for the EV priority mode is set smaller than that for the HV priority mode, by following the process procedure of FIG. 5. Therefore, as compared with the HV priority mode, the operating time from the start to the stop of engine 18 is substantially restricted in the EV priority mode.

In the EV priority mode as compared with the HV priority mode, it is less necessary to start engine 18 for ensuring the low-temperature startability and the drivability after the start, as described above. Thus, the operating time is restricted within the range that does not deteriorate the startability, so that the travel distance in the EV travel mode can be extended.

Figure 6:
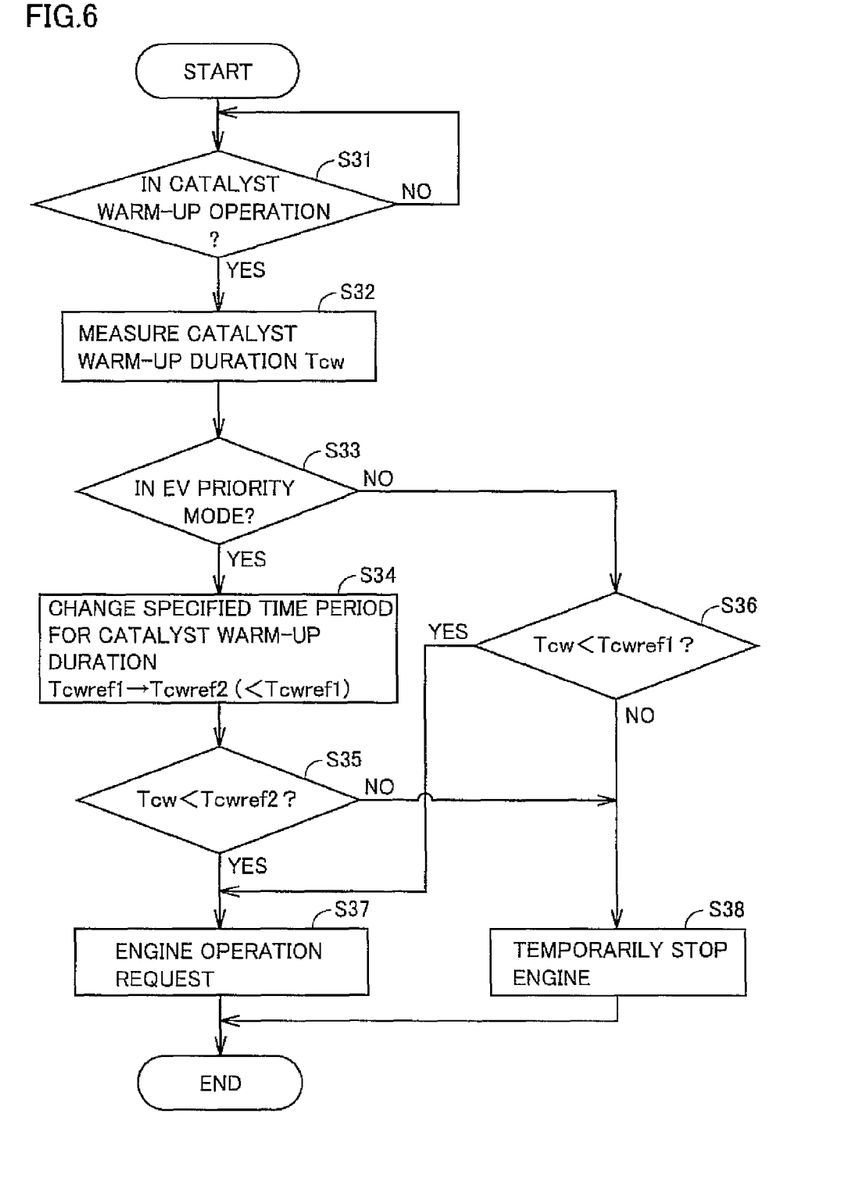

FIG. 6 is a flowchart showing a fourth example of the process procedure for generating an engine operation request according to an embodiment of the present invention. The process is repeatedly performed at predetermined time intervals by engine ECU 230 (FIG. 2) after the ignition switch is turned on.

Referring to FIG. 6, engine ECU 230 determines whether or not engine 18 is in catalyst warm-up operation (step S31). This catalyst warm-up operation is performed according to a catalyst warm-up request for promoting warm-up of catalyst. In the catalyst warm-up operation, engine 18 is controlled so that the ignition timing is retarded as compared with the normal ignition timing, for example. The retarded ignition timing retards the combustion timing and thus promotes increase of the temperature of catalyst in the catalytic converter through combustion even in the exhaust cycle.

When engine 18 is not in catalyst warm-up operation (NO in step S31), the process returns to the start.

In contrast, when engine 18 is in catalyst warm-up operation (YES in step S31), engine ECU 230 uses timer 238 (FIG. 2) to measure the time period elapsed from the start of the catalyst warm-up operation (hereafter also referred to as "catalyst warm-up duration") Tcw (step S32).

Further, based on a signal representing a travel mode from travel mode determination unit 206 (FIG. 2), engine ECU 230 determines whether or not vehicle 100 is traveling in the EV priority mode (step S33).

When vehicle 100 is not traveling in the EV priority mode (NO in step S33), namely vehicle 100 is traveling in the HV priority mode, engine ECU 230 determines whether or not catalyst warm-up duration Tcw is shorter than specified time period Tcwref1 set in advance (step S36). When catalyst warm-up duration Tcw is shorter than specified time period Tcwref1 (YES in step S36), engine ECU 230 generates the engine operation request for inhibiting temporary stop of engine (step S37).

In contrast, when catalyst warm-up duration Tcw not shorter than specified time period Tcwref1 (NO in step S36), engine ECU 230 temporarily stops engine 18 (step S38).

Returning to step S33, when vehicle 100 is traveling in the EV priority mode (YES in step S33), engine ECU 230 changes the specified time from specified time period Tcwref1 for the HV priority mode to Tcwref2 shorter than Tcwref1 (step S34). Then, engine ECU 230 determines whether or not catalyst warm-up duration Tcw is shorter than specified time period Tcwref2 after the change (step S35). When catalyst warm-up duration Tcw is shorter than specified time period Tcwref2 (YES in step S35), engine ECU 230 generates the engine operation request for inhibiting temporary stop of engine 18 (step S37).

In contrast, when catalyst warm-up duration Tcw is not shorter than specified time period Tcwref2 (NO in step S35), engine ECU 230 temporarily stops engine 18 (step S38).

As seen from above, the process procedure shown in FIG. 6 is followed to set the specified time period for specifying the timing at which the catalyst warm-up operation is to be stopped such that the specified time period for the EV priority mode is shorter than that for the HV priority mode. Thus, as compared with the HV priority mode, the catalyst warm-up duration is restricted in the EV priority mode.

In the EV priority mode as compared with the HV priority mode, it is less necessary to start engine 18 for ensuring the low-temperature startability and the drivability after the start, as described above. Thus, the catalyst warm-up duration can be restricted to extend the travel distance in the EV travel mode.

Figure 7:
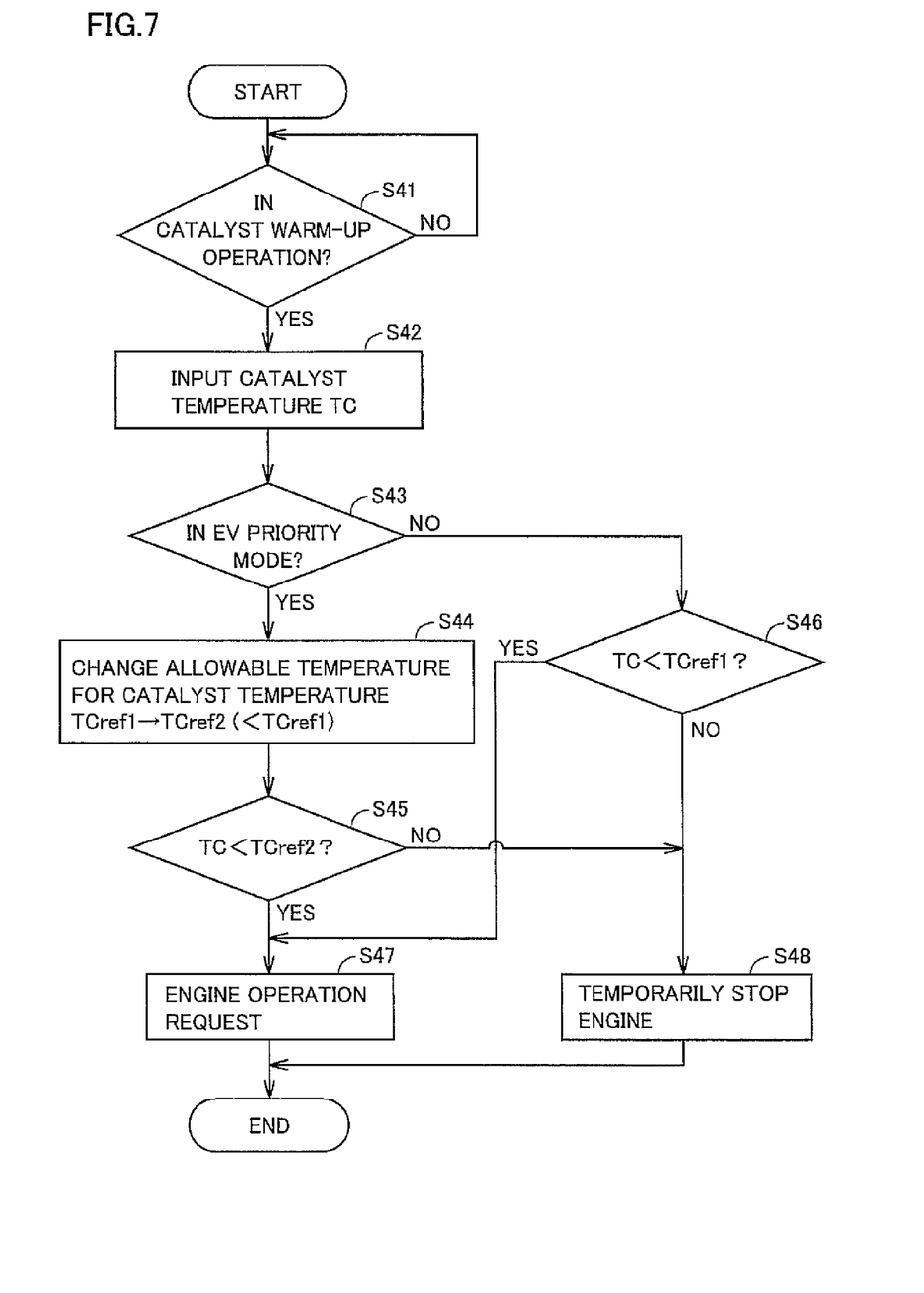

FIG. 7 is a flowchart showing a fifth example of the process procedure for generating an engine operation request according to an embodiment of the present invention. The process is repeatedly performed at predetermined time intervals by engine ECU 230 (FIG. 2) after the ignition switch is turned on.

Referring to FIG. 7, engine ECU 230 determines whether or not engine 18 is in catalyst warm-up operation (step S41). When engine 18 is not in catalyst warm-up operation (NO in step S41), the process returns to the start.

In contrast, when engine 18 is in catalyst warm-up operation (YES in step S41), engine ECU 230 detects catalyst temperature TC that is the temperature of catalyst in the catalytic converter, based on a detection signal that is input from temperature sensor 184 (FIG. 2) (step S42).

Further, engine ECU 230 determines whether or not vehicle 100 is traveling in the EV priority mode, based on a signal representing a travel mode from travel mode determination unit 206 (FIG. 2) (step S43).

When vehicle 100 is not traveling in the EV priority mode (NO in step S43), namely vehicle 100 is traveling in the HV priority mode, engine ECU 230 determines whether catalyst temperature TC is lower than allowable temperature TCref1 set in advance (step S46). When catalyst temperature TC is lower than allowable temperature TCref1 (YES in step S46), engine ECU 230 generates the engine operation request for inhibiting temporary stop of engine 18 (step S47).

In contrast, when catalyst temperature TC is not lower than allowable temperature TCref1 (NO in step S46), engine ECU 230 temporarily stops engine 18 (step S48).

Returning to step S43, when vehicle 100 is traveling in the EV priority mode (YES in step S43), engine ECU 230 changes the allowable temperature from allowable temperature TCref1 for the HV priority mode to TCref2 that is lower than TCref1 (step S44). Then, engine ECU 230 determines whether or not catalyst temperature TC is lower than allowable temperature TCref2 after the change (step S45). When catalyst temperature TC is lower than allowable temperature TCref2 (YES in step S45), engine ECU 230 generates the engine operation request for inhibiting temporary stop of engine 18 (step S47).

In contrast, when catalyst temperature TC is not lower than TCref2 (NO in step S45), engine ECU 230 temporarily stops engine 18 (step S48).

As seen from above, the process procedure shown in FIG. 7 is followed, so that the allowable temperature of the catalyst for specifying the timing at which the catalyst warm-up operation is to be stopped in the EV priority mode is set lower than that in the HV priority mode. Accordingly, the chance and time for performing the catalyst warm-up operation is restricted in the EV priority mode as compared with the HV priority mode.

Since it is less necessary in the EV priority mode as compared with the HV priority mode to start engine 18 for ensuring the low-temperature startability and the drivability after the start, as described above. Thus, the travel distance in the EV travel mode can be extended by restricting the chance and time for performing the catalyst warm-up operation.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control apparatus for a hybrid vehicle mounted with an internal combustion engine and an electric motor serving as a source of power for causing the vehicle to travel,
said hybrid vehicle including:
a chargeable and dischargeable power storage unit;
a charging unit for externally charging said power storage unit with electric power received from an external power supply, when said power storage unit is caused to enter a state chargeable by the external power supply; and
an electric power generation unit capable of generating electric power from drive force received from said internal combustion engine,
said electric motor generating drive force from electric power received from said power storage unit, and
said power storage unit being configured to be internally chargeable with electric power received from said electric power generation unit,
said control apparatus comprising:
a mode selection unit for selecting one of an EV priority mode and an HV priority mode for causing said vehicle to travel, said EV priority mode restricting internal charging of said power storage unit by said electric power generation unit, and said HV priority mode controlling internal charging of said power storage unit by said electric power generation unit such that a state of charge of said power storage unit is kept within a predetermined range;
an operation request generation unit for generating an operation request to said internal combustion engine when a predetermined operating condition is satisfied while said vehicle is traveling, said predetermined operating condition selected from at least one of a coolant temperature of said internal combustion engine and a temperature of a catalyst capable of purifying exhaust gas discharged from said internal combustion engine; and
an intermittent operation control unit for starting said internal combustion engine in response to said operation request and stopping said internal combustion engine in response to cancellation of said operation request,
said operation request generation unit changing said predetermined operating condition depending on whether said EV priority mode is selected or said HV priority mode is selected,
said control apparatus further comprises a start preparation unit for preparing for start of said internal combustion engine by preheating a sensor provided to an exhaust system for said internal combustion engine, and said operation request generation unit generates said operation request when preparation for start of said internal combustion engine is completed while said HV priority mode is selected, and said operation request generation unit does not generate said operation request when preparation for start of said internal combustion engine is completed while said EV priority mode is selected due to said changing of said predetermined operating condition depending on whether said EV priority mode is selected or said HV priority mode is selected.

2. The control apparatus for a hybrid vehicle according to claim 1, wherein said predetermined operating condition is said coolant temperature of said internal combustion engine and said operation request generation unit generates said operation request when said coolant temperature of said internal combustion engine is lower than a first threshold value while said EV priority mode is selected, and generates said operation request when the said coolant temperature of said internal combustion engine is lower than a second threshold value that is larger than said first threshold value while said HV priority mode is selected.

3. The control apparatus for a hybrid vehicle according to claim 1, wherein said predetermined operating condition is said temperature of said catalyst capable of purifying exhaust gas discharged from said internal combustion engine and said control apparatus further comprises a catalyst temperature obtaining unit for obtaining said catalyst temperature, and said operation request generation unit generates said operation request when said catalyst temperature is lower than a first allowable temperature while said EV priority mode is selected, and generates said operation request when said catalyst temperature of said catalyst is lower than a second allowable temperature that is higher than said first allowable temperature while said HV priority mode is selected.

4. The control apparatus for a hybrid vehicle according to claim 1, wherein said control apparatus further comprises a state estimation unit for estimating a state of charge of said power storage unit, and said mode selection unit selects said first travel mode when said state of charge is not smaller than a predetermined value, and switches said EV priority mode to said HV priority mode when said state of charge becomes smaller than said predetermined value.

* * * * *

UNITED STATES PATENT AND TRADEMARK OFFICE
CERTIFICATE OF CORRECTION

PATENT NO. : 9,004,207 B2  
APPLICATION NO. : 14/021668  
DATED : April 14, 2015  
INVENTOR(S) : Ryuta Teraya Page 1 of 1

It is certified that error appears in the above-identified patent and that said Letters Patent is hereby corrected as shown below:

Title page, item (73) "Assignee:" delete "Toyoda Jidosha Kabushiki Kaisha, Toyota-shi (JO)" and insert --Toyota Jidosha Kabushiki Kaisha, Toyota-shi (JP)--, therefor.

Signed and Sealed this  
Twelfth Day of April, 2016

Michelle K. Lee  
*Director of the United States Patent and Trademark Office*